United States Patent
Xu et al.

(10) Patent No.: US 9,756,347 B2
(45) Date of Patent: Sep. 5, 2017

(54) SCREEN CONTENT CODING SYSTEMS AND METHODS

(71) Applicant: FUTUREWEI TECHNOLOGIES, INC., Plano, TX (US)

(72) Inventors: Meng Xu, Brooklyn, NY (US); Zhan Ma, San Jose, CA (US); Haoping Yu, Carmel, IN (US)

(73) Assignee: Futurewei Technologies, Inc., Plano, TX (US)

( * ) Notice: Subject to any disclaimer, the term of this patent is extended or adjusted under 35 U.S.C. 154(b) by 430 days.

(21) Appl. No.: 14/339,351

(22) Filed: Jul. 23, 2014

(65) Prior Publication Data

US 2015/0030066 A1    Jan. 29, 2015

Related U.S. Application Data

(60) Provisional application No. 61/857,637, filed on Jul. 23, 2013.

(51) Int. Cl.
*H04N 19/186* (2014.01)
*H04N 19/503* (2014.01)
*H04N 19/463* (2014.01)
*H04N 19/94* (2014.01)

(52) U.S. Cl.
CPC ......... *H04N 19/186* (2014.11); *H04N 19/463* (2014.11); *H04N 19/94* (2014.11)

(58) Field of Classification Search
None
See application file for complete search history.

(56) References Cited

U.S. PATENT DOCUMENTS

| 4,743,959 A | * | 5/1988 | Frederiksen | ............ G06T 9/005 |
| | | | | 375/240.24 |
| 4,941,193 A | * | 7/1990 | Barnsley | ................. H04N 19/99 |
| | | | | 345/555 |
| 5,638,190 A | * | 6/1997 | Geist | ..................... H04N 1/644 |
| | | | | 358/500 |
| 5,926,222 A | * | 7/1999 | Nickerson | ............ H04N 19/176 |
| | | | | 375/240.04 |

(Continued)

FOREIGN PATENT DOCUMENTS

CN    102223541    * 10/2011

*Primary Examiner* — Frederick Bailey
(74) *Attorney, Agent, or Firm* — Conley Rose, P.C.

(57) ABSTRACT

Presented systems and methods facilitate screen content coding. A system can comprises: a processing component configured to execute coding operations and a storage component configured to store information for the processing component, including the color table and color index map. The coding operations can include: receiving information associated with a plurality of pixels; creating a color table, the color table includes color values (e.g., of the pixels) and corresponding indices; creating a color index map wherein each index of the color map maps a pixel to an index value of the color table; and performing coding operations corresponding to the color table and color index map. In one exemplary implementation, index values of the color table are encoded/decoded during color table and index map coding rather than the actual raw color values for each pixel. Various types of compression and coding can be implemented (e.g., lossless, lossy, intra-prediction, inter-prediction, etc.).

19 Claims, 11 Drawing Sheets

(56) References Cited

U.S. PATENT DOCUMENTS

| | | | | |
|---|---|---|---|---|
| 6,313,824 B1 * | 11/2001 | Meisner | ............ | G06T 11/60 |
| | | | | 345/589 |
| 6,542,162 B1 * | 4/2003 | Hrusecky | ............ | H04N 9/641 |
| | | | | 345/549 |
| 6,667,700 B1 * | 12/2003 | McCanne | ............ | H03M 7/30 |
| | | | | 341/50 |
| 6,980,222 B2 * | 12/2005 | Marion | ............ | G09G 5/06 |
| | | | | 345/543 |
| 2008/0130747 A1 * | 6/2008 | Moriya | ............ | H04N 19/56 |
| | | | | 375/240.15 |
| 2013/0335441 A1 * | 12/2013 | Zalev | ............ | A61B 5/7203 |
| | | | | 345/629 |

\* cited by examiner

200

210

Receiving information associated with a plurality of pixels.

220

Creating a color table, the color table comprising color values and corresponding indices, the color values in the color table corresponding to color values of the plurality of pixels.

230

Creating a color map wherein each index of the color map is mapped to an index value of the color table.

240

Performing coding operations corresponding to the color table and color map, wherein a coding scheme utilizes indications of respective runs of index values of the color table and respective runs of index values of the color map to other index values.

FIG. 2

| Pixel | Color |
|---|---|
| A | 10101010 |
| B | 10101010 |
| C | 10101010 |
| D | 11110000 |
| E | 11001100 |
| F | 00001111 |
| G | 10101010 |
| H | 11110001 |
| I | 11111001 |
| J | 00011110 |
| K | 00000000 |
| L | 00000010 |
| M | 00000100 |
| N | 00000110 |
| O | 10101010 |
| P | 11110000 |
| Q | 11001101 |
| R | 11010010 |
| S | 11010110 |
| T | 11011010 |
| U | 10101010 |
| V | 10101010 |
| W | 10101010 |
| X | 10101010 |
| Y | 10101010 |

FIG. 4

| Pixel | Color |
|---|---|
| *AA* | 10101010 |
| *BB* | 10101010 |
| CC | 10101010 |
| DD | 11110000 |
| EE | 11001100 |
| FF | 00001111 |
| GG | 10101010 |
| HH | 11110001 |
| II | 00110011 |
| JJ | 00011110 |
| KK | 00000000 |
| LL | 00000010 |
| MM | 00000100 |
| NN | 00000110 |
| OO | 10101010 |
| PP | 11110000 |
| QQ | 11001101 |
| RR | 11010010 |
| SS | 11010110 |
| TT | 11011010 |
| UU | 10101010 |
| VV | 10101010 |
| WW | 10101010 |
| XX | 10101010 |
| YY | 00110000 |

| Color Table Index | Color Value |
|---|---|
| 0000 | 10101010 |
| 0001 | 11110000 |
| 0010 | 00001111 |
| 0011 | 11001100 |
| 0100 | 00110011 |
| 0101 | 00000000 |
| 0110 | 00000010 |
| 0111 | 00000100 |
| 1000 | 00000110 |
| 1001 | 11010010 |
| 1010 | 11010110 |
| 1011 | 11011010 |
| 1010 | 00110000 |

910         920

| Pixel |
|---|
| AA,BB,CC,GG,OO,UU,VV,WW,XX, DD,HH,PP |
| FF,JJ |
| EE,QQ |
| II |
| KK |
| LL |
| MM |
| NN |
| RR |
| SS |
| TT |
| YY |

| 0000 | 0000 | 0000 | 0001 | 0011 |
|------|------|------|------|------|
| 0010 | 0000 | 0001 | 0100 | 0010 |
| 0101 | 0110 | 0111 | 1000 | 0000 |
| 0001 | 0011 | 1001 | 1010 | 1011 |
| 0000 | 0000 | 0000 | 0000 | 0000 |

1010

| 0000 | 0000 | 0000 | 0001 | 0011 |
|------|------|------|------|------|
| 0010 | 0000 | +0001 | +0011 | -0001 |
| +0011 | +0110 | +0110 | +0100 | -0010 |
| -0100 | -0011 | +0010 | +0010 | +1011 |
| -0001 | -0011 | -1001 | -1010 | -1011 |

1020

| 0000 | 0000 | 0000 | +0001 | +0010 |
|------|------|------|-------|-------|
| 0010 | -0010 | +0001 | +0011 | -0010 |
| 0101 | +0001 | +0001 | +0001 | -1000 |
| 0001 | +0010 | +0110 | +0001 | +0001 |
| 0000 | 0000 | 0000 | 0000 | 0000 |

| 1181 | 1182 | 1183 | 1184 | 1185 | |
|---|---|---|---|---|---|
| 0000 (A) | 0000 (B) | 0000 (C) | 0001 (D) | 0011 (E) | ← 1191 |
| 0010 (F) | 0000 (G) | 0001 (H) | 0100 (I) | 0010 (J) | ← 1192 |
| 0101 (K) | 0110 (L) | 0111 (M) | 1000 (N) | 0000 (O) | ← 1193 |
| 0001 (P) | 0011 (Q) | 1001 (R) | 1010 (S) | 1011 (T) | ← 1194 |
| 0000 (U) | 0000 (V) | 0000 (W) | 0000 (X) | 0000 (Y) | ← 1195 |

1110

| | | | | | |
|---|---|---|---|---|---|
| 0000 (a-vr) | 0000 (b-vr) | 0000 (c-vr) | 0001 (d-vr) | 0011 (e-vr) | ← 1171 |
| 0010 (f-vr) | 0000 (g-vr) | +0001 (h-vr) | +0011 (i-vr) | -0001 (j-vr) | ← 1172 |
| +0011 (k-vr) | +0110 (l-vr) | +0110 (m-vr) | +0100 (n-vr) | -0010 (o-vr) | |
| -0100 (p-vr) | -0011 (q-vr) | +0010 (r-vr) | +0010 (s-vr) | +1011 (t-vr) | |
| -0001 (u-vr) | -0011 (v-vr) | -1001 (w-vr) | -1010 (x-vr) | -1011 (y-vr) | |

1120

| 1151 | 1152 | | | | |
|---|---|---|---|---|---|
| 0000 (a-hr) | 0000 (b-hr) | 0000 (c-hr) | +0001 (d-hr) | +0010 (e-hr) | |
| 0010 (f-hr) | -0010 (g-hr) | +0001 (h-hr) | +0011 (i-hr) | -0010 (j-hr) | |
| 0101 (k-hr) | +0001 (l-hr) | +0001 (m-hr) | +0001 (n-hr) | -1000 (o-hr) | |
| 0001 (p-hr) | +0010 (q-hr) | +0110 (r-hr) | +0001 (s-hr) | +0001 (t-hr) | |
| 0000 (u-hr) | 0000 (v-hr) | 0000 (w-hr) | 0000 (x-hr) | 0000 (y-hr) | |

FIG. 11

SCREEN CONTENT CODING SYSTEMS AND METHODS

RELATED APPLICATIONS

The present application claims the benefit of and priority to Provisional Application 61/857,637 filed on Jul. 23, 2013, entitled USING COLOR MAPS IN SCREEN CONTENT ENCODING, which is incorporated herein by reference.

TECHNICAL FIELD

The present disclosure relates generally to the field of screen content coding.

BACKGROUND

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. The systems typically involve conveyance and display of information processing results (e.g., through various types of displays, screens, monitors, etc.), including various types of content.

In general, there are two types of display content. The first type contains a mix of camera-captured natural videos, images, and computer-generated graphics and texts. In this case, the camera-captured natural videos and images constitute a portion or portions of a source video frame and may have been compressed with visible compression artifacts. The second type of display content includes mainly computer generated graphics video and texts. Typical motion observed in this second type of content often includes window switching and moving, text scrolling, etc. This type of content usually exhibits clear textures and shape edges with distinct colors. In addition, the text and graphics material in this second type of content is generally not subject to prior lossy compression or processing (e.g., it is in the same condition as it was when generated).

The creation and preparation of content for display typically involves relatively large amounts of complex information processing and storage. With rapid and continuous advancements made in semiconductors, networking, communications, displays, computers, and other devices (e.g., tablets, smart phones, etc.) there is a long felt ever increasing desire for high efficiency video coding (HEVC) based solutions that can effectively and efficiently compress information. Recently, during on-going development of HEVC range extensions, more requests have been made in the Moving Picture Experts Group (MPEG) and in the Joint Collaborative Team on Video Coding (JCT-VC) asking for investigation of new coding tools for screen content and creation of appropriate and necessary profiles for these applications accordingly.

SUMMARY

Presented systems and methods facilitate effective and efficient display or screen content coding. In one embodiment, a system comprises: a processing component configured to execute coding operations and a storage component configured to store information for the processing component, including color tables and color index maps. The coding operations can include: receiving information associated with a plurality of pixels; creating a color table, wherein the color table includes color values (e.g., of the pixels) and corresponding color table indices; creating a color index map wherein each index of the color map is mapped to an index value of the color table; and performing coding operations corresponding to the color table and color index map. In one exemplary implementation, index values of the color table (e.g., rather than the actual raw color values for each pixel) are encoded/decoded during color index map coding.

In one embodiment, a coding scheme utilizes indications of respective runs of index values of the color table and respective runs of zero-index values of a residual color index map. In one exemplary implementation, a color index map coding scheme utilizes differential coding followed by run-length coding. The run length coding can include zero-run length coding. The color tables and color index maps can include lossless implementations and lossy implementations. The coding operations can include encoding operations and decoding operations.

In one embodiment, the plurality of pixels corresponds to one or more coding units (e.g., a block of pixels, a slice of pixels, a frame of pixels, etc.). The plurality of pixels can include computer graphics generated content (e.g., text, computer generated video, etc.). In one exemplary implementation, the coding unit is compatible with the HEVC framework.

BRIEF DESCRIPTION OF THE DRAWINGS

Embodiments of the presented systems and methods will be better understood from the following detailed description, taken in conjunction with the accompanying drawing figures in which like reference characters designate like elements. The accompanying drawings, which are incorporated in and form a part of this specification, illustrate embodiments by way of example and not by way of limitation. The drawings referred to in this specification should be understood as not being drawn to scale except if specifically noted.

FIG. 2 is a block diagram of an exemplary coding method in accordance with one embodiment of the present invention.

FIG. 4 is a block diagram of an exemplary illustration of pixel indications and corresponding color values in accordance with one embodiment of the present invention.

FIG. 5 is another block diagram of an exemplary illustration of pixel indications and corresponding color values in accordance with one embodiment of the present invention.

FIG. 9 is a block diagram of another exemplary lossy color table in accordance with one embodiment of the present invention.

FIG. 10 is a block diagram of an exemplary lossy color index map, an exemplary vertical residual index map, and an exemplary horizontal residual index map, in accordance with one embodiment of the present invention.

FIG. 11 is a block diagram of a modified exemplary lossy color index map, an exemplary vertical residual index map, and an exemplary horizontal residual index map that include indications of relationship to pixel, in accordance with one embodiment of the present invention.

DETAILED DESCRIPTION

Figure 1:
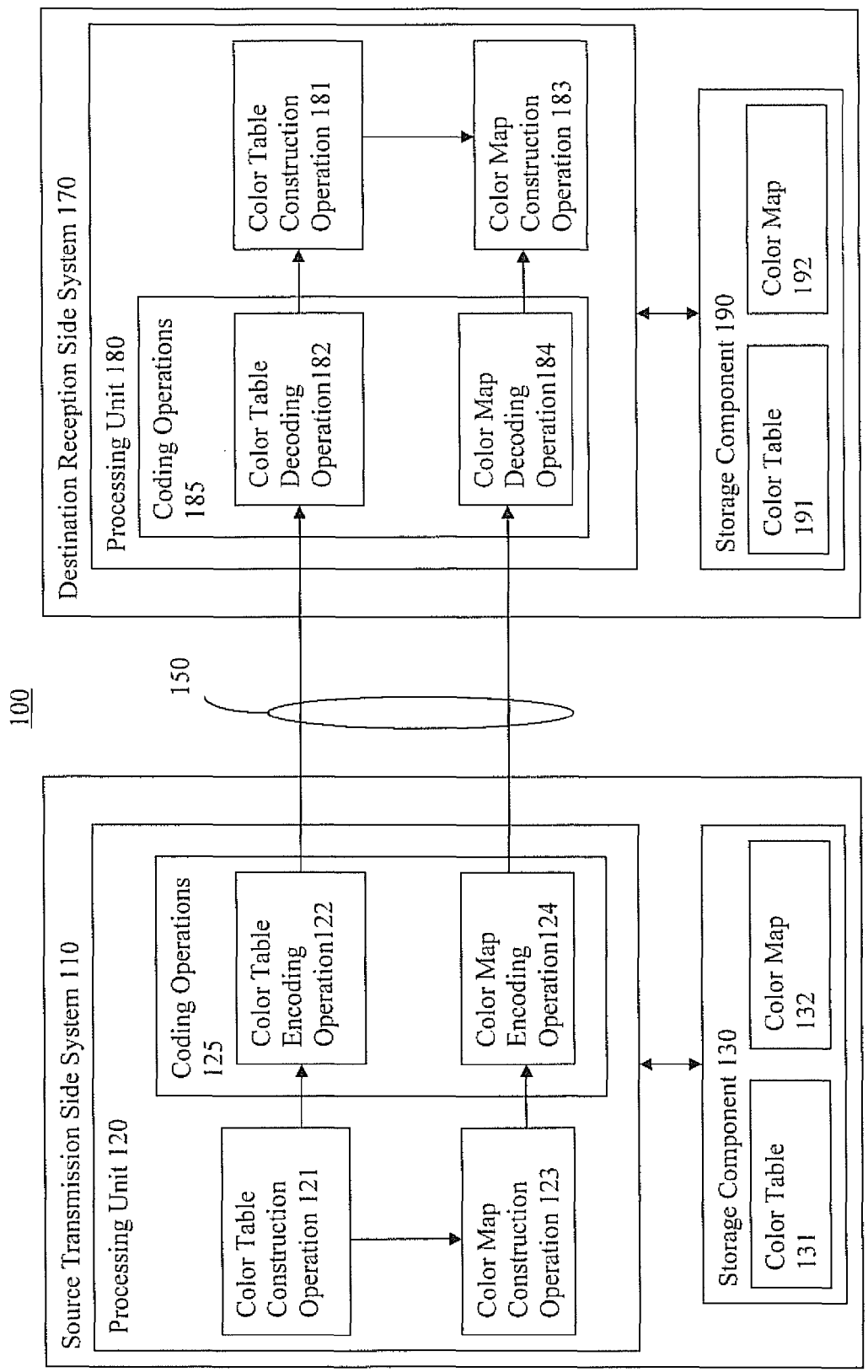
FIG. 1 is a block diagram of an exemplary screen content communication architecture in accordance with one embodiment of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and mechanisms have not been described in detail so as not to unnecessarily obscure aspects of the present disclosure.

Embodiments described herein may be discussed in the general context of computer-executable instructions, such as program modules, residing on some form of computer-readable storage medium executed by one or more computers or other devices. By way of example, and not limitation, computer-readable storage media may comprise non-transitory computer-readable storage media. Non-transitory computer-readable storage media includes all computer-readable media except for a transitory, propagating signal. Computer-readable storage media includes volatile and nonvolatile, removable and non-removable media implemented in any method or technology for storage of information such as computer-readable instructions, data structures, program modules or other data. Generally, program modules include routines, programs, objects, components, data structures, etc., that perform particular tasks or implement particular abstract data types. The functionality of the program modules may be combined or distributed as desired in various embodiments.

Presented systems and methods are directed towards facilitating efficient and effective communication and presentation of information. It is appreciated that the information or content can be presented in a variety of implementations (e.g., on a display, a screen, a monitor, etc.) Rather than repeatedly reciting an exhaustive listing of numerous possible implementations and types of presentations, for convenience, the presentation information is referred to herein as screen content through most of the rest of the detailed description. The term screen content is not intended to limit the device (e.g., type of display, screen, monitor, etc.) the screen content is presented on. It is appreciated the term screen content also applies to a variety of types of information (e.g., screen content can include graphics, video, text, etc.). The screen content can include information associated with a plurality of pixels.

In one embodiment, a color table and color index map are utilized to convey aspects of the screen content. Indices of the color table are associated with color values. Pixels corresponding to at least a portion of screen content are mapped to the indices of the color table so as to form the color index map. The color table and color index map are utilized in coding (e.g., encoding, decoding, etc) of information respectively describing the color table and color index map. In one exemplary implementation, the values of the color table are encoded/decoded using run-length coding rather than the actual raw color values for each pixel. In one exemplary implementation, the values of the color index map are encoded/decoded using differential coding followed by run-length coding. In one exemplary implementation, a zero-run based method is applied to code a residual map. It is appreciated presented coding approaches are compatible with a variety of configurations/schemes and can be readily implemented in a manner compatible with a variety of standards (e.g., HEVC, MPEG, JCT-VC, etc.). Additional explanation of the presented systems and methods is set forth in the following detailed description.

FIG. 1 is a block diagram of exemplary screen content communication architecture 100 in accordance with one embodiment of the present invention. Screen content communication architecture 100 includes two systems, a source transmission side system 110 and a destination reception side system 120. Source transmission side system 110 includes processing unit 120 and storage component 130. Processing unit 120 is configured to perform color table construction operation 121, color index map construction operation 123 and coding operation 125 (e.g., including color table encoding operation 122, color index map encoding operation 124, etc.). Storage component 130 is configured to store color table 131 and color index map 132. Destination reception side system 170 includes processing unit 180 and storage component 190. Processing unit 180 is configured to perform color table construction operation 181, color index map construction operation 183 and coding operation 185 (e.g., including color table decoding operation 182, color index map decoding operation 184, etc.). Storage component 190 is configured to store color table 191 and color index map 192. Communication path 150 enables communication of information between source transmission side system 110 and destination reception side system 170. It is appreciated that communication page 150 can include a variety of configurations (e.g., wireless, a single bus or line, multiple busses or lines, etc.).

It is appreciated that screen content communication architecture 100 is compatible with a variety of approaches to color table creation, color index map creation, and coding schemes. Color tables and color index maps can be lossless or lossy. Coding operations can be compatible with original compression schemes or predictive compression schemes (e.g., intra prediction, inter prediction, etc.). In an effort to give an overview, a general description of screen content communication architecture 100 is presented initially and additional explanation of various aspects (e.g., lossy, lossless, predictive, etc.) of operations that are compatible with screen content communication architecture 100 are set forth in later portions of the detailed description.

In one embodiment, processing unit 120 receives screen content, including information associated with a plurality of pixels. The screen content can be generated by a graphics processing component (not shown). The graphics processing component can be included in source transmission side system 110 or external to source transmission side system 110. Color table construction operation 121 creates a color table (e.g., similar to color table 131). Color index map construction operation 123 creates a color index map (e.g., similar to color index map 132). The color index map includes color table index values. In one embodiment, coding operation 125 includes encoding color table index values from a color index map. Color table encoding operation 122 encodes the color table and color index map encoding operation 124 encodes the color index map. Source transmission side system 110 forwards encoded color table information and encoded color index map information on communication path 150.

In one embodiment, processing unit 180 receives screen content, including information associated with a plurality of pixels. The screen content can include encoded color table information and encoded color index map information. The encoded color table information and encoded color index map information can be received from communication path 150. In one embodiment, coding operation 185 includes decoding color table index values from an encoded color index map. Color table decoding operation 182 decodes the color table and color table decoding operation 184 decodes the color index map. Color table construction operation 181 creates a color table (e.g., similar to color table 191). Color index map construction operation 183 creates a color index map (e.g., similar to color table 192). In one exemplary implementation, the color table and color index map are utilized to recreate content for presentation on a screen or display component.

It is appreciated the components of exemplary screen content communication architecture 100 can include a variety of configurations and implementations. For example, processing units 120 and 180 can include processors, application specific integrated circuits, dedicated hardware, and so on. Storage components 130 and 190 can include random access memory (RAM), cache memory, flash memory, hard drives, and so on. The operations (e.g., color table creation, color index map creation, coding, etc.) can be performed in hardware, firmware, software and combinations thereof.

FIG. 2 is a block diagram of a coding method 200 in accordance with one embodiment of the present invention. The coding operations of coding method 200 can include encoding, decoding, or both. In one embodiment, coding method 200 is directed to coding of received screen content, including information associated with a plurality of pixels. In one embodiment, coding method 200 is implemented in systems similar to those in screen content communication architecture 100. In one exemplary implementation, the sequence of operations executed in coding method 200 depends upon whether the coding method 200 is being primarily directed to screen content source side generation and transmission or screen content destination side reception and display. For example, in one exemplary source transmission approach the color table and color index map are created first and then encoded. Alternatively, in one exemplary destination reception approach, encoded color table information and color index map information is decoded and then the respective color table and color index map are respectively created. A general description overview of coding method 200 is presented initially and additional explanation of various aspects (e.g., lossy, lossless, predictive, etc.) of method 200 compatible operations is set forth in later portions of the detailed description.

In block 210, information associated with a plurality of pixels is received. In one embodiment, the information associated with the plurality of pixels corresponds to screen content. It is appreciated that the information received in block 210 can depend upon whether subsequent operations are primarily directed to a screen content generation and transmission side or a screen content reception and display side. In an embodiment primarily directed to generation and transmission of screen content, raw (e.g., un-encoded, etc.) screen content is received and the process proceeds in the following sequence: block 220, block 230 and block 240. In one exemplary implementation, screen content includes raw color information (e.g., raw pixel red-green-blue values, raw luminance and chrominance values, etc). In an embodiment primarily directed to reception and display of screen content, encoded screen content is received and the process proceeds in the following sequence: block 240, block 220 and block 230.

Figure 6:
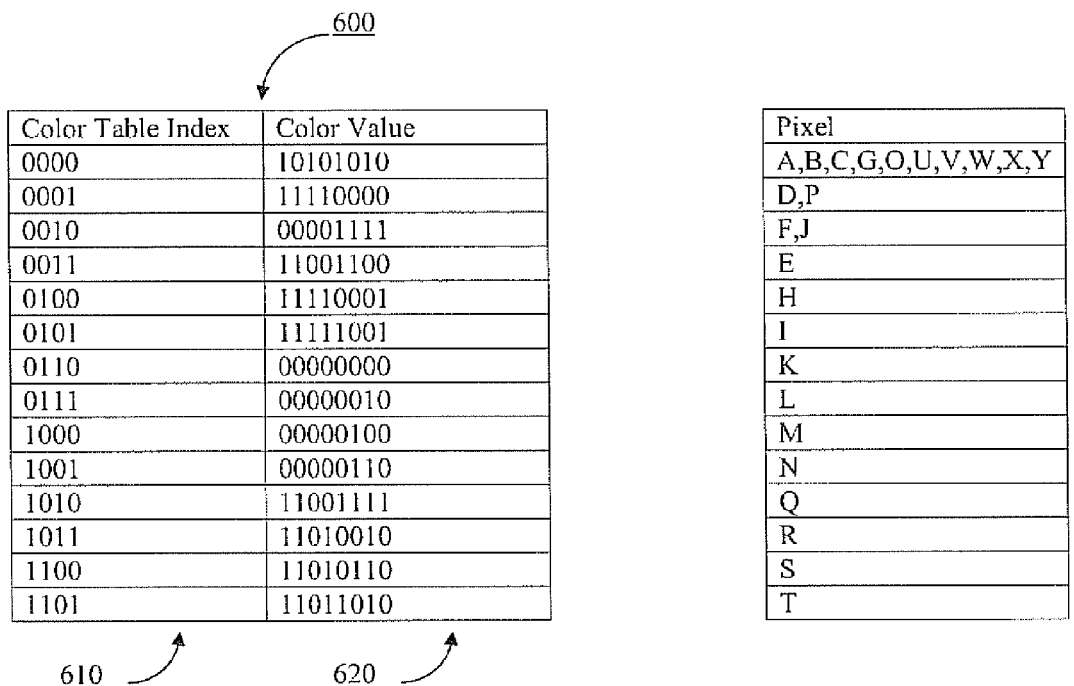
FIG. 6 is a block diagram of an exemplary lossless color table in accordance with one embodiment of the present invention.
Figure 7:
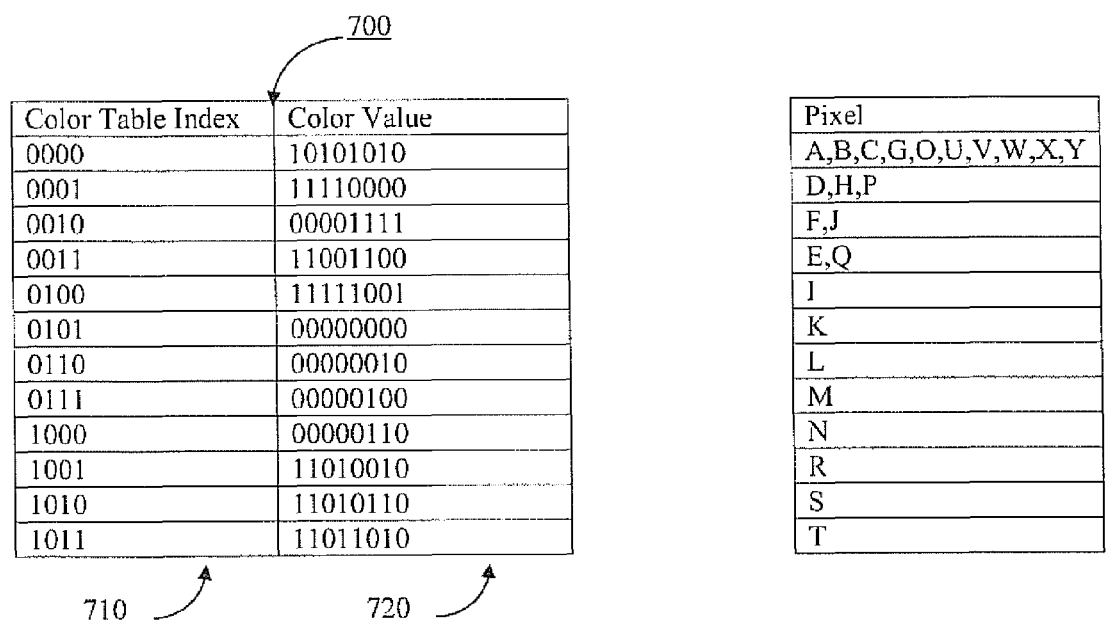
FIG. 7 is a block diagram of an exemplary lossy color table in accordance with one embodiment of the present invention.

In block 220 a color table is created. In one embodiment, the color table includes color values and corresponding color table indices, the color values in the color table correspond to color values of the plurality of pixels. In one exemplary implementation, color tables illustrated in FIGS. 6, 7, 8 and 9 are created (additional description of FIGS. 6, 7, and 9 is presented in later portions of the detailed description) according to the frequency of occurrence of each pixel in this coding unit.

In block 230, a color index map is created. In one embodiment, the color index map includes pixels that are mapped to color table index values. In one embodiment, color table index values are converted from the original raw colors (e.g., pixels) to corresponding indices from the color table (e.g., a color table created in block 220 operations, etc.). In one exemplary implementation, a color index map illustrated in FIG. 10 is created (additional description of FIG. 10 is presented in later portions of the detailed description).

In block 240, coding operations are performed. Coding operations can include encoding and decoding operations. In one embodiment, performing coding operations can correspond to the color table and color index map. In one exemplary implementation, a coding scheme utilizes indications of respective runs of color values of the color table and respective runs of index values of the color map. Values in a color map can be coded using differential coding followed by run-length coding. In one exemplary implementation, a zero-run based approach is applied to code a residual map (e.g., the coding of the color map can utilize zero index values of a residual color map, etc.). It is appreciated different coding schemes can be used for coding operations associated with a color table and coding operations associated with a color index map. Additional explanation and some exemplary implementations of the coding operations are set forth in later portions of the detailed description.

Figure 3:
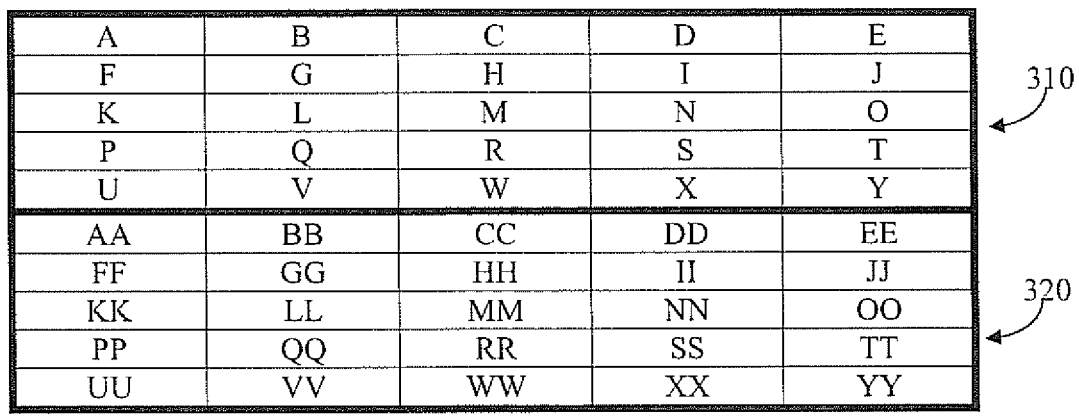
FIG. 3 is a block diagram of an exemplary first coding unit of pixels and a second coding unit of pixels.

In one embodiment, the presented systems and methods are associated with coding of information configured or included in coding units. In one exemplary implementation, a coding unit corresponds to a plurality of pixels. It is appreciated a coding unit can correspond to a block, slice, etc. of pixels. FIG. 3 is a block diagram of an exemplary first coding unit of pixels 310 and an exemplary second coding unit of pixels 320. The first coding unit 310 includes pixels A through Y and the second coding unit 320 includes pixels AA through YY. The first coding unit of pixels 310 and second coding unit of pixels 320 can have a relationship to one another (e.g., spatial relationship, display sequence relationship, display timing relationship in which one coding unit is displayed before another coding unit, etc.). In one exemplary implementation, first coding unit of pixels 310 and second coding unit of pixels 320 are neighbors with respect to display location. In FIG. 3, the first coding unit of pixels 310 is a neighbor on top of the second coding unit of pixels 320. It is appreciated the first coding unit of pixels 310 and the second coding unit of pixels 320 can have a variety of spatial relationships to one another (e.g., left, top, bottom, right, etc).

As indicated above, the sequence of operations executed in the presented systems and methods can depend upon whether the operations are primarily directed to a screen content generation and transmission side or screen content reception and display side. For ease of explanation, a screen content generation and transmission side (including color table creation, color index map creation and encoding, etc.) is explained first. In one embodiment, pixel indications and corresponding color values are received. FIG. 4 is a block diagram of an illustration of exemplary pixel indications and corresponding color values in accordance with one embodiment of the present invention. In one exemplary implementation, each row includes a full or raw color value for each pixel in a coding unit similar to coding unit 310. FIG. 5 is another block diagram of an illustration of exemplary pixel indications and corresponding color values in accordance with one embodiment of the present invention. In one exemplary implementation, again each row includes a full or raw color value for each pixel in a coding unit similar to coding unit 320. The exemplary illustration in FIG. 5 is similar to the exemplary illustration in FIG. 4, except the color value (e.g., 00110011) in FIG. 5 for pixel II has changed from the color value (e.g., 11111001) in FIG. 4 for pixel I. Also, a new color value of 0011000 corresponding to pixel YY has been added (e.g., last entry) to the illustration in FIG. 5.

With reference now to color table creation (e.g., similar to block 210 of coding method 200 in FIG. 2). For each coding unit or block of pixels, a color table may be created where each pixel color value corresponds to a color table index. The pixel color value may be represented in a planar mode or by its component color values such as a red value (R), a green value (G), and a blue value (B) or a luminance value (Y), a chrominance value (U), and a chrominance value (V) (e.g., a color table for each component color). Alternatively the pixel color value may be represented in packed mode or by a complete or combined color sample representation such as red value (R) followed by green value (G) and further followed by blue value (B) (e.g., in the same color table), or luminance value (Y) followed by chrominance value (U) and further followed by chrominance value (V) (e.g., in the same color table).

FIG. 6 is a block diagram of a lossless color table 600 in accordance with one embodiment of the present invention. Lossless color table 600 includes lossless color table indices in column 610 and corresponding color values in column 620. In the figures (e.g., FIGS. 6, 7, 8, etc.) illustrating color tables and color index maps, the column (e.g., far right column) indicating the corresponding pixels designations (e.g., A, B, C, etc.) is not part of the color table or color index map, but rather is shown in the figures for presentation convenience and as an aid in understanding the presented systems and methods. In one exemplary implementation, lossless color table 600 illustrated in FIG. 6 is constructed from received pixel color value information (e.g., similar to information in FIG. 4). As illustrated by the exemplary lossless color table 600 in FIG. 6, pixels A, B, C, G, O, U, V, W, X and Y with the color value 10101010 can now be represented by the index 0000, pixels D and P with the color value 1111000 can now be represented by the index 0001, and the pixels F and J with the color value 00001111 can now be represented by the index value 0010. The number of color table index bits (e.g., 4 bits) per pixel is less than the number of color value bits (e.g., 8 bits) per pixel. The lossless table is also smaller with fewer rows or entries (e.g., 14 rows) than the exemplary full pixel color value information (e.g., 25 rows) illustrated in FIG. 4.

As illustrated in FIG. 6, for an exemplary lossless coding mode, every pixel in the coding unit or block is represented by its true or exact pixel value in the color table. On the other hand, for a lossy coding mode, some of the pixels in the coding unit or block may be represented by an approximation to their true or exact color value. This approximation process may be carried out based on some rate distortion metrics. FIG. 7 is a block diagram of a lossy color table 700 in accordance with one embodiment of the present invention. Lossy color table 700 includes lossy color table indices in column 710 and corresponding color values in column 720. In one exemplary implementation, lossy color table in FIG. 7 is constructed from received pixel color value information (e.g., similar to information in FIG. 4). The exemplary lossy color table 700 in FIG. 7 is similar to exemplary lossless color table 600 in FIG. 6, except the color values that where close to one another (e.g., within a value of 1) are included in the same lower value index. For example, the pixel H with a true color value of 11110001 is within 1 of the index 0001 color value of 11110000 and therefore the index 0001 is now used for the pixel H. Also the pixel Q with a true color value of 11001101 is within 1 of the index 0100 color value of 11001100 and therefore the index 0100 is now used for the pixel Q. The lossy color table 700 is smaller with fewer rows or entries (e.g., 12 rows) than the exemplary lossless table 600 illustrated in FIG. 6 (e.g., 14 rows).

Figure 8:
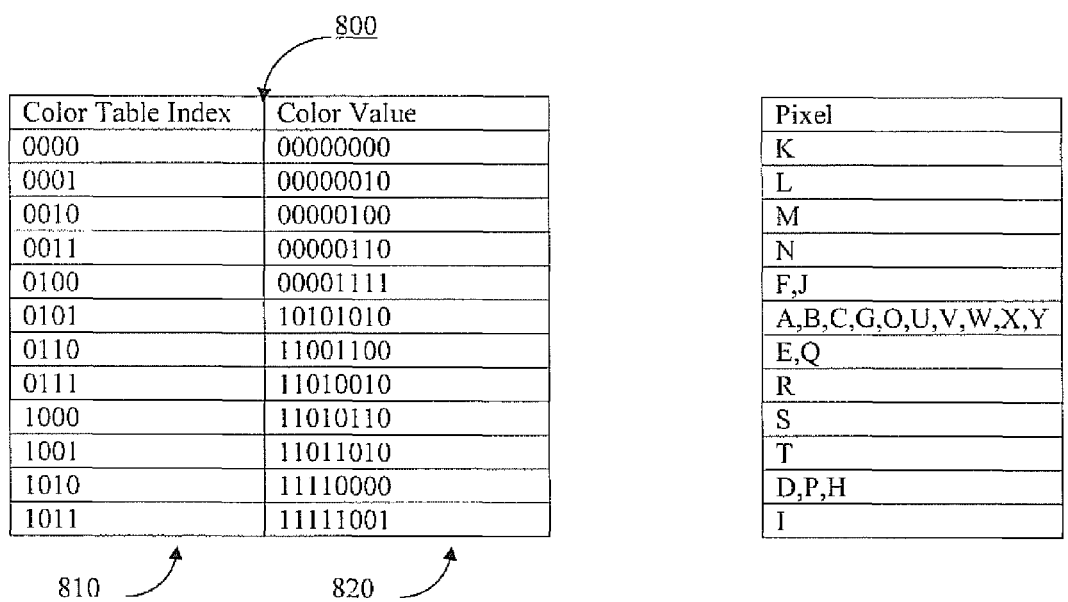
FIG. 8 is a block diagram of an exemplary lossy color table in accordance with one embodiment of the present invention.

It is appreciated the pixel values in a color table may be arranged in a variety of ways. In one embodiment, the order of the pixel color value in the color table may follow their occurrence frequency in the current coding unit or block. For example, as illustrated in FIG. 6 and FIG. 7 a first entry or index of the color table corresponds to a pixel value that occurs the most in the coding unit or block, and a second entry or index corresponds to a pixel value that exists the second most in the coding unit or block, and so on. An alternative ordering approach is configured in accordance with the actual ascending or descending pixel color value. In a pixel color value ascending approach, the first entry or index corresponds to the smallest pixel color value of the coding unit or block and the second entry or index corresponds to the second largest pixel color value, and so on. In a pixel color value descending approach, the first entry or index has the largest pixel color value of the coding unit or block and the second entry or index has the second largest pixel color value, and so on. FIG. 8 is a block diagram or a lossy color table 800 in accordance with one embodiment of the present invention. Lossy color table 800 includes lossy color table indices in column 810 and corresponding color values in column 820. In one embodiment, a lossy color table 800 is similar to a lossy color table 700 in the sense that similar color values correspond to the color table indices. In one embodiment, lossy color table 800 is ordered according to an ascending pixel color value (e.g., ascending pixel color values in column 820) rather than the occurrence frequency of pixels with the color value. For example, in ascending color value order of FIG. 8, the color values 00000000 and 00000010 correspond to index values 0000 and 00001 respectively, while in the occurrence frequency order of FIG. 7 the color values 10101010 and 11110000 correspond to index values 0000 and 00001 respectively. It is appreciated that an ordering arrangement (e.g., occurrence frequency, descending pixel color values, ascending pixel color values, etc.) can apply to both lossy and lossless color tables.

FIG. 9 is a block diagram of another exemplary lossy color table 900 in accordance with one embodiment of the present invention. Lossy color table 900 includes lossy color table indices in column 910 and corresponding color values in column 920. The exemplary lossy color table 900 in FIG. 9 is similar to exemplary lossy color table 700 in FIG. 7, except the color value (e.g., 00110011) for lossy color table 900 index 0100 has changed from the color value (e.g., 11111001) for lossy color table 700 index 0100. Also, a new index 1010 with a color value of 0011000 corresponding to pixel YY has been added to lossy color table 900. Thus, the size of lossy color table 900 (e.g., 13 rows) is bigger than the size of lossy color table 700 (e.g., 12 rows) but still smaller than a lossless color table would be (e.g., 14 rows). The lossy grouping of pixels can be performed using a rate distortion method or a very straightforward threshold.

The color table information can be encoded. In one embodiment, the encoded color table information is included in a bitstream (e.g., a video bitstream, a bitstream related to graphics information, etc.). In one embodiment, an exemplary color table size indication may be included in a compressed video bitstream. In one embodiment, a syntax element ColorTableSize is used to signal or indicate the size of a color table.

In one embodiment of a lossless case, a ColorTableSize value is defined as a total number of actual color values or entries in a coding unit or block. In one embodiment of a lossy case, a ColorTableSize value is defined as a total number of color values that are selected as the base color values to represent the entire coding unit or block. The ColorTableSize may be represented by a fixed-length number (e.g., 8 bits for an 8-bit color component, 24 bits for a complete RGB or YUV color sample, etc.). It can also be represented by any variable-length codes such as Exponential-Golomb codes, Rice codes, or even custom-made variable-length codes (e.g., which can be derived by ordering the ColorTableSize values in this slice or frame based on their probabilities, etc.), and so on. After a color table has been created, the color table may be encoded and included in a compressed/encoded video bitstream (e.g., that is transmitted to a decoder, etc.).

In one exemplary embodiment, encoding of the color table may be performed by simply using the original binary representation of the actual color values. Alternatively, predictive coding schemes may also be used to encode the color table, which may result in better coding efficiency. Typically, two kinds of predictive coding schemes may be used. One exemplary type of predictive coding is applying the prediction only within the color table associated with the current block, which is noted as an intra block color table coding in this document. In one exemplary implementation of intra block color table coding, color values utilized in performing the coding are within the color table associated with current coding unit or block being encoded. The other type of predictive coding is performing the predictive coding among neighboring coding units or blocks, which is noted here as the inter block color table coding. In one exemplary implementation, another color table is utilized to create another color index map, and inter block color table coding is performed wherein the other color table is utilized in the coding operations associated with the color table currently being encoded. In one embodiment, a flag indicates whether intra table prediction coding is performed or inter block color table prediction coding is performed.

In one embodiment, the intra block color table coding starts from the first actual color value in the table, then takes a delta value between the second and the first color entries, and so on. Note that in the case where a color table is not ordered for each delta value, its sign and absolute value will be encoded jointly. In one exemplary implementation, if the color table is ordered (either descending or ascending), only the color delta is required to be encoded in the bitstream.

In another embodiment, intra block color table coding for a color table may be performed using the idea of run-length codes. In one embodiment, a coding scheme utilizes an indication of a run of at least a portion of indices (e.g., color table indices, color map indices, etc.). In one exemplary implementation, the indication of a run of at least a portion of the indices includes an indication of the number values with a particular characteristic to one another, wherein the particular characteristic is a particular difference in respective values (e.g., color values, color table index values, etc.). For example, if the entry in the color table keeps increasing with a same step delta or step difference, such as 47, 48, 49, 50, 51, 52 with the same step difference of 1, the step difference 1 is encoded and followed by a run value which represents the number of the following entries sharing a similar step difference value. In the present example, the step difference is also the delta between successive color entries. In the above example, the run value is equal to 5. In another embodiment, an alternative process is to only count the run value when the step value is equal to 1, thus the step value does not need to be coded. In one exemplary implementation, only the gap between adjacent groups and the length of each run are coded.

With reference to color table 700 illustrated in FIG. 7, one exemplary intra block color table coding will be as follows:
10101010 (0, 4), 11110000, 00001111, 11001100, 1111001, 00000000 (2, 3), 11010010 (4, 2).

To briefly describe, the initial entry value is 10101010 and the zero in the (0, 4) indicates there is no change for the next 4 entries. The 11110000 indicates the entry for the next index (e.g., 0001 index) is 11110000, the 00001111 indicates the entry for the next (e.g., 0010 index) is 00001111. This pattern of each entry value being individually specified continues until the 00000000 (2, 3) code. The 00000000 (2, 3) indicates the entry for the next index (e.g., 0101 index) is 00000000 and increases by 2 for the next 3 entries. For example, the entry for index 0110 is 00000010, the entry for index 0111 is 00000100, and the entry for index 1000 is 00000110. The 11010010 (4, 2) indicates the entry for the next index (e.g., 1001 index) is 11010010 and increases by 4 for the next 2 entries.

Inter block color table coding can also be used. To further improve the coding efficiency, the first entry of the color table can be predicted by considering the color table of neighboring coding units or blocks. In one embodiment, this is based on an assumption that neighboring coding units or blocks normally share a similar color or pixel distribution. One exemplary process uses a color from the left or upper block (when they are available) to predict the first entry of the color table in this block. Similar to the explanation of the intra block color table coding, the first color entry is encoded using its actual value. Using this inter block color table coding operation can further reduce the redundancy.

In one embodiment, an exemplary color table coding scheme may use all entries in previous color tables instead of one color as aforementioned. In one embodiment, assuming a previous color table size is PreviousColorTableSize, each entry in the previous color table may be referred by its index PreviousColorTableIndex that has a total number of bits equal to Floor[log 2[PreviousColorTableSize−1]]+1 bits, where Floor[x] takes the integer part of x. One exemplary predictive approach is to use a 1-bit flag, (e.g., UsePreviousIndex, etc.) for every entry in the current color table. When this flag is equal to 1, the index in the previous table at the similar index or location will be written to the bitstream to represent the current index. When this flag is equal to 0, the actual color value will be written into the bitstream instead. In general, this exemplary process may be applied to any color table-ordering scheme. However, it usually may work better when the entries in a color table are ordered following the pixel values.

One alternative predictive approach offering a potential further improvement in coding efficiency is to use an "Index+Run" pair, instead of using the index in the previous table by itself. Here "index" may mean the starting index location in the previous color table and "run" may mean the number of table entries in the current color table that are the same as those in the previous color table following the "index". In one embodiment, the total number of bits representing the run is equal to Floor[log 2[CurrentColorTableSize−1]]+1. This approach can also use a 1-bit flag, (e.g., similar to UsePreviousIndex as described above) for each "Index+Run" pair or any entry in the color table that doesn't exist in the previous color table. In general, this approach can provide further coding efficiency gains over using the index in the previous table by itself.

The following is an explanation of an inter color table coding scheme in one exemplary implementation. Assuming the previous color table includes values [1, 2, 3, 4, 100, 101, 102, 250, 251, 252] and the current color table includes values [1, 2, 3, 4, 80, 100, 101, 251, 252]. The indices for the previous color table include the following:

| Index | 0 | 1 | 2 | 3 | 4 | 5 | 6 | 7 | 8 | 9 |
|---|---|---|---|---|---|---|---|---|---|---|
| Value | 1 | 2 | 3 | 4 | 100 | 101 | 102 | 250 | 251 | 255 |

The indices for the table the current color table include the following:

| Index | 0 | 1 | 2 | 3 | 4 | 5 | 6 | 7 | 8 | 9 |
|---|---|---|---|---|---|---|---|---|---|---|
| Value | 1 | 2 | 3 | 4 | 80 | 100 | 101 | 102 | 251 | 255 |

Then the encoded current color table will be as the following:
  UsePreviousIndex(=1) (0, 4), UsePreviousIndex(=0) (80), UsePreviousIndex(=1) (4, 2), UsePreviousIndex(=1) (8, 2).

In one embodiment, an exemplary decoding process for the color table may be straightforward. For example, the decoder receives the color table general information (e.g., if the table is made for color component or complete color sample, etc.) as well as the ColorTableSize information from the bitstream. From the value of ColorTableSize information, as well as the bit-depth information about the video, the decoder can determine the number of bits in encoding the color map index and the number or bits in encoding the map entry. Then, according to the actual color index map encoding scheme, the decoder can reconstruct the color index map. The color index map can be decoded and reconstructed by a variety of approaches. The color index map can be decoded and reconstructed by retrieving the color index map entries directly from the bitstream. The color index map can be decoded and reconstructed by decoding the delta step in the case of intra block color table coding. The color index map can also be decoded and reconstructed by using the index information from a previously coded color table together with the decoded run information in the current color table in the case of inter block color table coding. In one exemplary implementation, the data or pixel values of the current table will be calculated by a simple addition as in the case of intra block color table coding, or copied from a previous previously coded color table to the current table as in the inter block color table coding.

In one embodiment, for each pixel block that is encoded by this approach with a color table, color values are replaced by the index values from the current color table. As a result, a color index map is created for the block. Again, each index is represented by a total number of bits equal to Floor[log 2[CurrentColorTableSize−1]]+1. In the case of lossless coding every pixel is represented by the base color in the color table without any change to its value (e.g., each color value of a plurality of pixels is associated with a color table index that represents the exact raw color value of the original pixel, etc.). In the case of lossy coding some pixels will be represented by the base colors in the color table that are an approximation of their original values (e.g., a color value corresponding to an index associated with at least one of the plurality of pixels is an approximation of an actual raw color value of the plurality of pixels). In one embodiment of color map creating and coding, differential coding followed by run-length coding is utilized. In the differential coding stage, each row in a vertical residual approach (or column in a horizontal residual approach) is subtracted by the respective previous row (or column), except for the first one (which can be specifically designated, e.g., copied from the color index map, etc.). In one exemplary implementation of screen content, the residual color index map obtained after the differential coding stage includes lots of zeros. A zero-run based approach can be applied to code the residual color index map.

FIG. 10 is a block diagram of exemplary lossy color index map 1000, an exemplary vertical residual index map 1010, and an exemplary horizontal residual index map 1020, in accordance with one embodiment of the present invention. As illustrated by the exemplary lossy color index map 1000, the color index map is created from the raw pixels illustrated in block 310 of FIG. 3 using index values from color table 700 in FIG. 7 (which in turn provides a correspondence to color values of pixels A-Z). A vertical residual index map 1010 is created by applying horizontal raster scan (from left to right for each entry in one row, and top to bottom for each row) on the color index map 1000, and subtracting each row with the previous row, except for the first row. A horizontal residual index map 1020 is created by applying vertical raster scan (from top to bottom for each entry in one column, and left to right for each column) on the color index map 1000, and subtracting each column with the previous column, except for the first column.

In one embodiment, an exemplary prediction process is carried out on the color table indices in the current color index map, and vertical or horizontal residual coding is then applied, by subtracting the indices from an adjacent above row or left column. FIG. 11 is a block diagram of a modified exemplary lossy color index map 1100, an exemplary vertical residual index map 1110, and an exemplary horizontal residual index map 1120. FIG. 11 is similar to FIG. 10 except the cells in FIG. 11 also include indications of relationship to pixels from FIGS. 3 and 7. Indicating the corresponding pixels designations (e.g., A, B, C, etc.) is not part of the color index map, but rather is shown in the FIG. 11 for presentation convenience and as an aid in understanding the presented systems and methods. Lossy color index map 1100 includes columns 1181 through 1185 and rows 1191 through 1195. The values of the cells in lossy color index map 1100 are index values from the color table 700 in FIG. 7 corresponding to the pixels from FIG. 3. For example, the color table index value 0000 in cell (C) of lossy color index map 1100 corresponds to the index value 0000 from color table 700 (which FIGS. 7 and 3 indicate is associated with pixel C), the color table index value 0001 in cell (D) of lossy color index map 1100 corresponds to the index value 0001 from color table 700 (which FIGS. 7 and 3 indicate is associated with pixel D), and so on. The values in vertical residual index map 1110 are a result of initial row 1171 being the same as row 1191 of lossy color index map 1100 and the values in the remaining rows being the result of subtracting the indices from adjacent above row. For example, the +0011 value in cell (i-vr) in row 1172 is the result of subtracting the 0001 value in cell (D) of row 1191 from the value 0100 in cell (I) of row 1192. The values in horizontal residual index map 1120 are a result of initial column 1151 being the same as column 1181 of lossy color index map 1100 and the values in the remaining rows being the result of subtracting the indices from adjacent left column. For example, the +0001 value in cell (l-hr) in column 1152 is the result of subtracting the 0101 value in cell (K) of column 1181 from the value 0110 in cell (L) of column 1182.

The scan direction is signaled by a 1-bit flag IndexScanDirection that is encoded in the bitstream for each coding block. For the prediction pixels outside the scope of the current color index map, (e.g., the pixels that don't belong to the current coding block), their color map indices may be created either by directly using the current color table, if their pixel values are the same as the pixels in the current block, or by using some approximation approach. If it is the latter case, both the encoder and the decoder have to use the same approximation approach to prevent encoding and decoding mismatch. For example, if the reconstructed pixels in the bottom row of an upper block or in the most right column of a left block are available, given that the color table is known for this block, a straightforward way is assigning the color map index for the pixels in the upper block row and the left block column by comparing them with the entries in the color index map of the current block. If the pixels are not the same as the entries in the color table, the index may be assigned so that the associated color is closest to the pixel in the upper or left block, or the one from the color table that produces minimum color difference.

In general, the prediction residuals of the color map index may be encoded by a run-length approach. To further reduce the bits for coding a color map, a pair of Level and Zero-run may be used, instead of Zero-run and Level, where Level represents the non-zero index residual and Zero-run represents the number of zero index prediction residuals preceding the non-zero Level. However, for a block that contains all zero index prediction residuals, a single 1-bit zero may be encoded, instead of a Level and Zero-run pair. Again, this may further improve the coding efficiency.

In one embodiment, the basic or general color index map encoding notation is either a non-zero index Level or a (Zero, length of Zero-run) pair. In one exemplary implementation, the coding for color map 1010 (shown in FIG. 10) is as follows:

(0, 3), (1), (3), (2), (0, 1), (1), (3), (−1), (3), (6), (6), (4), (−2), (−4), (−3), (2), (2), (11), (−1), (−3), (−9), (−10), (−11).

To briefly describe, the first entry (0, 3) indicates the first 3 indices are all 0. The next (1) indicates the next index is 1. The next (3) indicates the next entry is 3. The next (2) indicates the next entry is 2. The next (0, 1) indicates the next entry is 0, with repeating length of 1. A similar convention follows for the remaining parenthetical indications.

Either fixed length coding or variable length coding may be applied to make a binary representation of the Level and Zero-run. For the case with fixed length coding, the total number of bits to represent Zero-run is equal to Floor[log 2[CurrentTotalNumberPixels−1]], and the total number of bits to represent Level is equal to Floor[log 2[CurrentColorTableSize−1]]+2, because the residual can be a negative number. This additional bit may be seen as the sign bit. In one exemplary embodiment, Context Adaptive Binary Arithmetic Coding (CABAC) may be used to encode these binary representations. The decoding process may also be straightforward. First, a scan direction of the index map is decoded from the flag IndexScanDirection. Then, the color map index residuals may be decoded by the CABAC decoder. Then the current color index map may be reconstructed by adding the appropriate prediction to the index residuals. Finally, the pixel values rendering may be determined by applying the color index in the current color table.

As previously explained, a color table includes an association or correspondence of color table index values to raw color values and a color index map includes an association or correspondence of pixels to the color table index values. In one embodiment, the pixels in a color index map can be considered indices of the color table. In an effort to avoid potential confusion between indices of a color index map and indices of a color table, the term pixel is utilized in reference to a color index map.

In one embodiment, presented approaches including a color table and color map based solution in an exemplary HEVC codec may be readily implemented. An exemplary color table and associated color map coding may be added at a coding unit (CU) level or at a coding tree unit (CTU) or even at a Slice level. In any case, a flag needs to be added to signal if this exemplary process is to be applied to a current block of pixels under compression. If this approach is applied to the CU level, each CU will have its own color table. However, if this approach is applied to the CTU or the Slice level, only one color table is encoded in the bitstream. Such a single color table may include the pixels in the current CTU or Slice. Meanwhile, a sub-CU may use the same color table in deriving its color map without using an individual color table at the CU level.

Presented systems and methods are compatible with a variety of applications. Such applications may include wireless displays, tablets as a second display, control rooms with a high resolution display wall, digital operating rooms (DiOR), transmission and storage of medical image data (including 3-D volume image data), virtual desktop infrastructure (VDI), screen/desktop sharing and collaboration, cloud computing, factory automation displays, supervisory control and data acquisition (SCADA) displays, automotive/navigation display, PC over IP (PCoIP), ZeroClient, remote sensing, etc. Some of these applications have been considered as target applications in the design of a HEVC approach. It is also appreciated that while the presented systems and methods may be described with respect to particular implementations, presented systems and methods are readily adaptable to a variety of implementations. For example, while presented systems and methods may be described with respect to pluralities of pixels and screen content, presented systems and methods are readily implemented with respect to a variety of information or content (e.g., graphics generated, camera captured, general video, image, text, mixture of different types of content, etc.).

Although certain embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A system comprising:
    a processor configured to execute operations comprising:
        receiving information associated with a plurality of pixels, wherein the information for each pixel comprises that pixel's numeric color value;
        creating a color table, wherein the color table comprises a plurality of entries, wherein each entry is accessed using an index value, and wherein each entry comprises one of the numeric color values present in the plurality of pixels;
        creating a color index map, wherein the color index map comprises a plurality of entries, wherein each entry corresponds to one pixel of the plurality of pixels, and wherein each entry comprises an index value into the color table;
        creating a residual color index map, wherein the residual color index map comprises a plurality of entries, wherein each entry corresponds to one pixel of the plurality of pixels, and wherein each entry comprises the difference between a first index value in the color index map and a second index value in the color index map;
        performing coding operations corresponding to the color index map and the residual color index map, wherein a coding scheme utilizes indications of respective runs of entries in the color index map and entries in the residual color index map; and
    a memory configured to store information for the processor, including the color table, the color index map, and the residual color index map.

2. The system of claim 1, wherein the coding operations comprise encoding operations.

3. The system of claim 1, wherein the coding operations comprise decoding operations.

4. The system of claim 1, wherein the color values utilized in performing the coding are within the color table and intra block color table coding is performed.

5. The system of claim 1, wherein another color table is utilized to create another color index map, and inter block color table coding is performed wherein the other color table is utilized in the coding operations associated with the color table currently being encoded.

6. The system of claim 1, wherein creating the color table results in one of:
    lossless compression, wherein the color value of each of the plurality of pixels is associated with a color table entry that represents the exact raw color value of the original pixel; and
    lossy compression, wherein a color value of at least one of the plurality of pixels is associated with a color table entry that is an approximation of an actual raw color value of the at least one of the plurality of pixels.

7. The system of claim 1, wherein the coding is compatible with high efficiency video coding (HEVC).

8. The system claim 1, wherein a flag indicates whether intra block predictive color table coding is performed or inter block predictive color table coding is performed.

9. The system of claim 1, wherein the plurality of pixels correspond to one or more coding units.

10. The system of claim 1, wherein the plurality of pixels comprises computer graphics generated content.

11. A coding method comprising:
    receiving video content into a computer memory, wherein the video content includes information associated with a plurality of pixels, and wherein the information for each pixel comprises a color value;
    creating a color table, wherein the color table comprises a plurality of entries, wherein each entry is accessed using an index value, and wherein each entry of the color table comprises a color value present in the plurality of pixels,
    encoding the color table, wherein a color table encoding scheme utilizes an indication of a run of at least a portion of the values of the entries in the color table;
    creating a color index map, wherein the color index map comprises a plurality of entries, wherein each entry corresponds to one pixel of the plurality of pixels, and wherein each entry comprises an index value into the color table;
    encoding the color index map, wherein a color index map encoding scheme utilizes an indication of a run of at least a portion of the entries in the color index map;
    creating a residual color index snap, wherein the residual color index map comprises entries, wherein each entry corresponds to one pixel of the plurality of pixels, and wherein each entry comprises the difference between a first index value in the color index map and a second index value in the color index map;
    encoding the residual color index map, wherein a residual index color map encoding scheme utilizes an indication of a run of at least a portion of the entries in the residual color index map; and
    storing, in the computer memory, the results of the color table encoding, the color index map encoding, and the residual color index map encoding,
    wherein the steps of receiving video content, creating the color table, encoding the color table, creating the color index map, encoding the color index map, creating the residual color index map, encoding the residual color index map, and storing the results are performed by a computer processor.

12. The method of claim 11, wherein the indication of a run of at least a portion of the values of the entries in the color table comprises an indication of the number of values with a particular characteristic to one another, wherein the particular characteristic is a particular difference in respective values.

13. The method of claim 11, wherein the color table encoding includes an indication of whether the values corresponding to the run of the color table entries are the same as values corresponding to a similar run of the color table entries included in another color table previously created.

14. The method claim 11, wherein an order of pixel values in the color table correspond to one of:
    an occurrence frequency of pixels associated with a particular color value;
    pixel values from smallest to greatest; and
    pixel values from greatest to smallest.

15. The method of claim 11, wherein creating the color index map comprises determining an index value difference between adjacent rows or columns from current color index map.

16. A decoding method comprising:
receiving an encoded indication of a color table into a computer memory, wherein the encoded indication of the color table includes an indication of a run of color table entries;
decoding the encoded indication of the color table to create a color table, wherein each of a plurality of pixel color values corresponds to an index of entry in the color table;
receiving an encoded indication of a color index map into a computer memory, wherein the indication of the color index map includes an, indication of the run of color index map entries;
receiving an encoded indication of a residual color index map into a computer memory, wherein the residual color index map comprises entries, wherein each entry corresponds to one pixel of the plurality of pixel color values, and wherein each entry comprises the difference between a first index value in the color index map and a second index value in the color index map; and
decoding the indication of the color index map and the indication of the residual color index map to create the color index map, wherein each index of the color map is mapped to an index of an entry in the color table and wherein a residual index color map decoding scheme utilizes an indication of a run of at least a portion of the tries in the residual color index map, and
wherein the steps of receiving an encoded indication of a color table, decoding the encoded indication of the color table, receiving an encoded indication of a color index map, receiving an encoded indication of a residual color index map, and decoding the indication of the color index map and the indication of the residual color index map are performed by a computer processor.

17. The method of claim 16, wherein the run of the color map entries includes an indication of the number of color table entries with a particular characteristic to one another, wherein the particular characteristic is a particular difference in respective color table entry values.

18. The method of claim 16, wherein screen content associated with the plurality of pixel color values includes at least one of:
text;
graphics; and
video.

19. The method of claim 16, wherein the decoding the encoded indication of the color table utilizes a delta value between a current color entry and a previous color entry, and wherein an initial entry of the color table is predicted by considering color tables of neighboring pixel blocks.

* * * * *

UNITED STATES PATENT AND TRADEMARK OFFICE
CERTIFICATE OF CORRECTION

PATENT NO. : 9,756,347 B2
APPLICATION NO. : 14/339351
DATED : September 5, 2017
INVENTOR(S) : Meng Xu et al.

It is certified that error appears in the above-identified patent and that said Letters Patent is hereby corrected as shown below:

In the Claims

Column 16, Lines 8-49, Claim 11, should read:
11. A coding method comprising:
    receiving video content into a computer memory, wherein the video content includes information associated with a plurality of pixels, and wherein the information for each pixel comprises a color value;
    creating a color table, wherein the color table comprises a plurality of entries, wherein each entry is accessed using an index value, and wherein each entry of the color table comprises a color value present in the plurality of pixels,
    encoding the color table, wherein a color table encoding scheme utilizes an indication of a run of at least a portion of the values of the entries in the color table;
    creating a color index map, wherein the color index map comprises a plurality of entries, wherein each entry corresponds to one pixel of the plurality of pixels, and wherein each entry comprises an index value into the color table;
    encoding the color index map, wherein a color index map encoding scheme utilizes an indication of a run of at least a portion of the entries in the color index map;
    creating a residual color index map, wherein the residual color index map comprises entries, wherein each entry corresponds to one pixel of the plurality of pixels, and wherein each entry comprises the difference between a first index value in the color index map and a second index value in the color index map;
    encoding the residual color index map, wherein a residual index color map encoding scheme utilizes an indication of a run of at least a portion of the entries in the residual color index map; and
    storing, in the computer memory, the results of the color table encoding, the color index map encoding, and the residual color index map encoding,
    wherein the steps of receiving video content, creating the color table, encoding the color table, creating the color index map, encoding the color index map, creating the residual color index map, encoding the residual color index map, and storing the results are performed by a computer processor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*

Column 17, Lines 5-28, through Column 18, Lines 1-11, Claim 16, should read:

16. A decoding method comprising:

receiving an encoded indication of a color table into a computer memory, wherein the encoded indication of the color table includes an indication of a run of color table entries;

decoding the encoded indication of the color table to create a color table, wherein each of a plurality of pixel color values corresponds to an index of entry in the color table;

receiving an encoded indication of a color index map into a computer memory, wherein the indication of the color index map includes an indication of the run of color index map entries;

receiving an encoded indication of a residual color index map into a computer memory, wherein the residual color index map comprises entries, wherein each entry corresponds to one pixel of the plurality of pixel color values, and wherein each entry comprises the difference between a first index value in the color index map and a second index value in the color index map; and decoding the indication of the color index map and the indication of the residual color index map to create the color index map, wherein each index of the color map is mapped to an index of an entry in the color table and wherein a residual index color map decoding scheme utilizes an indication of a run of at least a portion of the entries in the residual color index map, and wherein the steps of receiving an encoded indication of a color table, decoding the encoded indication of the color table, receiving an encoded indication of a color index map, receiving an encoded indication of a residual color index map, and decoding the indication of the color index map and the indication of the residual color index map are performed by a computer processor.